United States Patent
Wizon et al.

(10) Patent No.: US 7,418,418 B2
(45) Date of Patent: Aug. 26, 2008

(54) SYSTEM AND METHOD FOR PRICING FIXED INCOME SECURITIES

(75) Inventors: Adam Wizon, New Providence, NJ (US); Joseph M. Kochansky, New York, NY (US); Matthew Goldman, White Plains, NY (US)

(73) Assignee: Blackrock Financial Management, Inc., New York, NY (US)

( * ) Notice: Subject to any disclaimer, the term of this patent is extended or adjusted under 35 U.S.C. 154(b) by 1289 days.

(21) Appl. No.: 10/167,001

(22) Filed: Jun. 11, 2002

(65) Prior Publication Data

US 2002/0198812 A1    Dec. 26, 2002

Related U.S. Application Data

(60) Provisional application No. 60/297,519, filed on Jun. 12, 2001.

(51) Int. Cl.
G06Q 40/00 (2006.01)

(52) U.S. Cl. .................................................. 705/36 R

(58) Field of Classification Search ............. 705/35, 705/36 R, 37
See application file for complete search history.

(56) References Cited

U.S. PATENT DOCUMENTS

| | | | |
|---|---|---|---|
| 5,689,651 A | 11/1997 | Lozman | 395/237 |
| 5,749,077 A | 5/1998 | Campbell | 705/36 |
| 5,774,880 A | 6/1998 | Ginsberg | |
| 5,784,696 A | 7/1998 | Melnikoff | 705/36 |
| 5,794,229 A | 8/1998 | French et al. | 707/2 |
| 5,806,048 A | 9/1998 | Kiron et al. | 705/36 |
| 5,857,176 A | 1/1999 | Ginsberg | |
| 5,911,135 A | 6/1999 | Atkins | 705/36 |
| 5,911,136 A | 6/1999 | Atkins | 705/36 |
| 5,946,666 A | 8/1999 | Nevo et al. | 705/36 |
| 5,946,667 A | 8/1999 | Tull, Jr. et al. | 705/36 |
| 5,950,176 A | 9/1999 | Keiser et al. | |
| 6,012,042 A | 1/2000 | Black et al. | 705/36 |
| 6,026,381 A | 2/2000 | Barton, III et al. | 705/35 |
| 6,088,685 A | 7/2000 | Kiron et al. | 705/36 |
| 6,122,623 A | 9/2000 | Garman | 705/36 |
| 6,185,543 B1 | 2/2001 | Galperin et al. | |
| 6,249,775 B1 | 6/2001 | Freeman et al. | 705/36 |
| 6,278,981 B1 | 8/2001 | Dembo et al. | 705/36 |
| 6,292,787 B1 | 9/2001 | Scott et al. | 705/36 |
| 6,292,811 B1 | 9/2001 | Clancey et al. | 707/503 |
| 6,347,307 B1 | 2/2002 | Sandhu et al. | 705/35 |
| 6,456,982 B1 | 9/2002 | Pilipovic | 705/36 |
| 6,484,152 B1 | 11/2002 | Robinson | 705/36 |
| 6,839,686 B1 * | 1/2005 | Galant | 705/36 R |
| 2002/0161690 A1 * | 10/2002 | McCarthy et al. | 705/37 |
| 2003/0033212 A1 * | 2/2003 | Sandhu et al. | 705/26 |

* cited by examiner

*Primary Examiner*—Jagdish N Patel
*Assistant Examiner*—Kenneth L Bartley
(74) *Attorney, Agent, or Firm*—Scott D. Wofsy; George N. Chaclas; Edwards Angell Palmer & Dodge LLP

(57) ABSTRACT

A computer-based system is disclosed for pricing fixed income securities which includes a tool for selecting a portfolio of fixed income securities stored in a portfolio database, a graphical user interface for designating a pricing method for a selected fixed income security in the selected portfolio using computer readable character strings, a processor for calculating the price of the selected fixed income security based upon the designated pricing method.

33 Claims, 2 Drawing Sheets

SYSTEM AND METHOD FOR PRICING FIXED INCOME SECURITIES

CROSS-REFERENCE TO RELATED APPLICATIONS

The subject application claims the benefit of priority to U.S. Provisional Patent Application Ser. No. 60/297,519 filed Jun. 12, 2001, the disclosure of which is incorporated herein by reference in its entirety.

BACKGROUND OF THE INVENTION

1. Field of the Invention

The subject invention is directed to financial portfolio management, and more particularly, to a computer-based system and method for analyzing fixed income securities based on user-defined pricing methodologies.

2. Background of the Related Art

Portfolio managers perform risk analysis on fixed income securities to measure or estimate the exposure of particular securities to certain risk factors such as interest rates, credit spreads, prepayment speeds, volatility and other composite variables. This enables a portfolio manger to balance or aggregate risk across an entire portfolio.

To measure the risk of a security it must first be priced. For example, fixed income securities such as corporate or agency bonds can be priced relative to a spread over a specified yield curve or relative to a certain benchmark. Similarly, mortgage-backed security can be priced based upon a particular prepayment model with a specified prepayment speed.

In the past, the pricing of a fixed income security was done by programming an analytical processor with a specific formula designed to perform a desired pricing calculation on the security. This method of pricing a security to measure risk is time consuming and laborious. It would be beneficial therefore, to provide a computer-based system and method for effectively and efficiently designating a pricing method for a fixed income security utilizing a compact character string input into a data field in a graphical user interface.

SUMMARY OF THE INVENTION

The subject invention is directed to a new and useful computer-based system for pricing fixed income securities in connection with an analytical processor used by portfolio mangers to perform risk and pricing analysis. The system includes means for selecting a portfolio of fixed income securities stored in a portfolio database, means for designating a pricing method for a selected fixed income security in the selected portfolio, and means for calculating the price of the selected fixed income security based upon the designated pricing method.

Preferably, the means for designating a pricing method for a selected fixed income security includes means for entering a compact computer readable character string in a specific field of a graphical user interface, wherein the character string represents a preferred pricing methodology for the security. The means for designating a pricing method includes means for designating a pricing method based on volatility, yield, a yield curve, a pricing benchmark such as a reference point on a yield curve, a spread, or an option adjusted spread. In the case of a mortgage backed securities, the means for designating a pricing method includes means for designating a pricing method based on a projected prepayment model and means for designating an intensity for the prepayment speed.

In accordance with a preferred embodiment of the subject invention, the system includes a portfolio database containing a plurality of portfolios each having a plurality of fixed income securities and a graphical user interface operatively associated with the portfolio database. The graphical user interface includes means for selecting a portfolio of fixed income securities stored in the portfolio database, and means for designating a pricing method for at least one selected fixed income security in the selected portfolio by entering a computer readable character string in a field of the graphical user interface, wherein the expression represents the pricing method. The system further includes a processor that includes means for calculating the price of the selected fixed income security based upon the computer readable character string.

The subject invention is also directed to a method of pricing fixed income securities comprising the steps of selecting a portfolio of fixed income securities stored in a portfolio database, designating a pricing method for a selected fixed income security in the selected portfolio, and calculating the price of the selected fixed income security based upon the designated pricing method. Preferably, the step of designating a pricing method for a selected fixed income security in the selected portfolio includes the step of entering a computer readable character string in a field of a graphical user interface, wherein the computer readable character string represents a preferred pricing methodology.

These and other aspects of the pricing system of subject invention and the method of using the same will become more readily apparent to those having ordinary skill in the art from the following detailed description of the invention taken in conjunction with the drawings described hereinbelow.

BRIEF DESCRIPTION OF THE FIGURES

So that those having ordinary skill in the art to which the subject invention pertains will more readily understand how to make and use the system of the subject invention, embodiments thereof will be described in detail hereinbelow with reference to the figures, wherein.

DETAILED DESCRIPTION OF THE PREFERRED EMBODIMENTS

Figure 1:
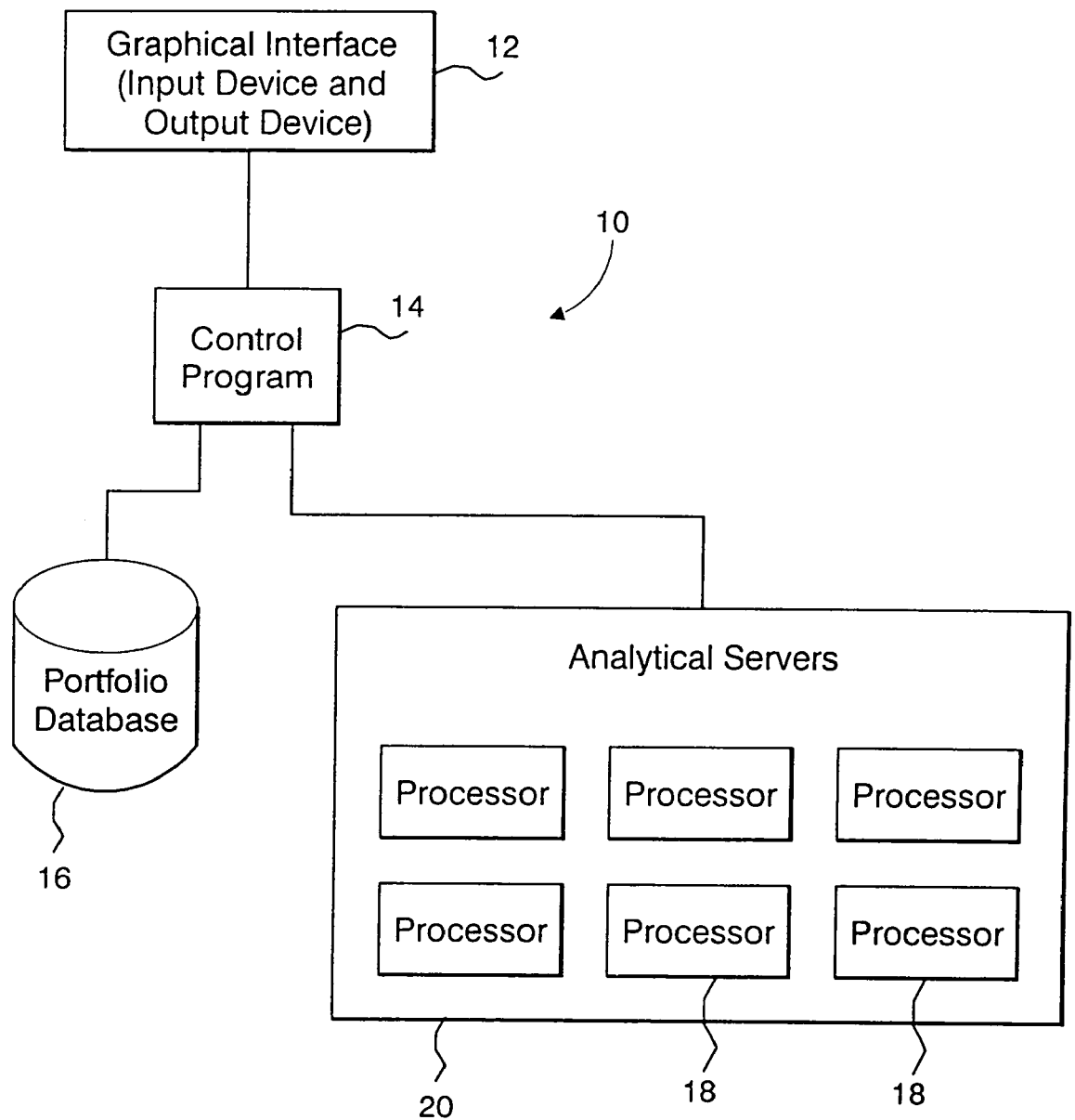
FIG. 1 is a schematic representation of the architecture of a computer-based security pricing system configured in accordance with a preferred embodiment of the subject invention.

Referring now to the drawings wherein like reference numerals identify similar aspects of the system of the subject invention, there is illustrated in FIG. 1 a schematic representation of the core functional components of the computer-based security pricing system of the subject invention, which is designated generally by reference numeral 10. Security pricing system 10 is adapted and configured to facilitate user-defined pricing of fixed income securities in order to perform a risk analysis thereon. More particularly, the system of the subject invention enables a user, through a graphical interface, to selectively price fixed income securities based upon selected pricing methods to perform a risk based analysis thereon. The system is intended for use by, among others, portfolio managers, agents, custodians and investors.

Security pricing system 10 includes a graphical interface 12 that includes input and output devices. Graphical interface 12 is operatively associated with a control program 14 containing an instruction set written in a conventional computing language such as HTML, C++ or Java. Control program 14 coordinates the interactive relationship between the graphical interface 12, a portfolio database 16 and a set of processors 18 which receive data and instructions and function as analytical servers 20 for managing data throughput.

Portfolio database 16 stores a plurality of investment portfolios owned by individual or institutional investors. Each portfolio includes a plurality of investment products in the form of fixed income securities such as U.S. Treasury notes or bonds, municipal, corporate or agency bonds, mortgage-backed securities or derivative instruments.

The analytical servers 20 are preferably web-based and are adapted and configured to analyze securities contained within each portfolio in database 16 based on real-time market data. The analytical servers provide inter-day and intra-day computations and provide flexibility to a portfolio manager to change underlying assumptions, including the price of a security. More particularly, the analytical servers are configured to perform real-time analyses on a portfolio of fixed income securities based upon static measures, option-adjusted measures and horizon analysis using different variables including, for example, real-time yield curves, prepayment models, volatility and curve shocks.

The security pricing system 10 of the subject invention provides a broad range of analytical tools for defining a pricing methodology for a particular security, including measures such as price, yield, volatility, spread and option adjusted spread. The system also includes historical and real-time yield curves and pricing benchmarks that provide reference points on yield curves or specific securities from which spreads may be quoted to designate a pricing method.

Exemplary yield curves include an interpolated on-the-run Treasury curve, interpolated swap curve, LIBOR curve, Treasury fit curve, agency reference curve, agency benchmark curve, as well as zero-coupon Treasury curves including coupon strip and principal strip curves. Exemplary benchmarks include Treasury OTR, swap rate, agency reference and agency bench.

The system also provides tools for pricing mortgage-backed securities including prepayment models and prepayment speeds. These include constant prepayment rates (CPR), proprietary prepayment models such as BRS, and simplified prepayment models such as PSA, ABS, MHP and HEL.

Figure 2:
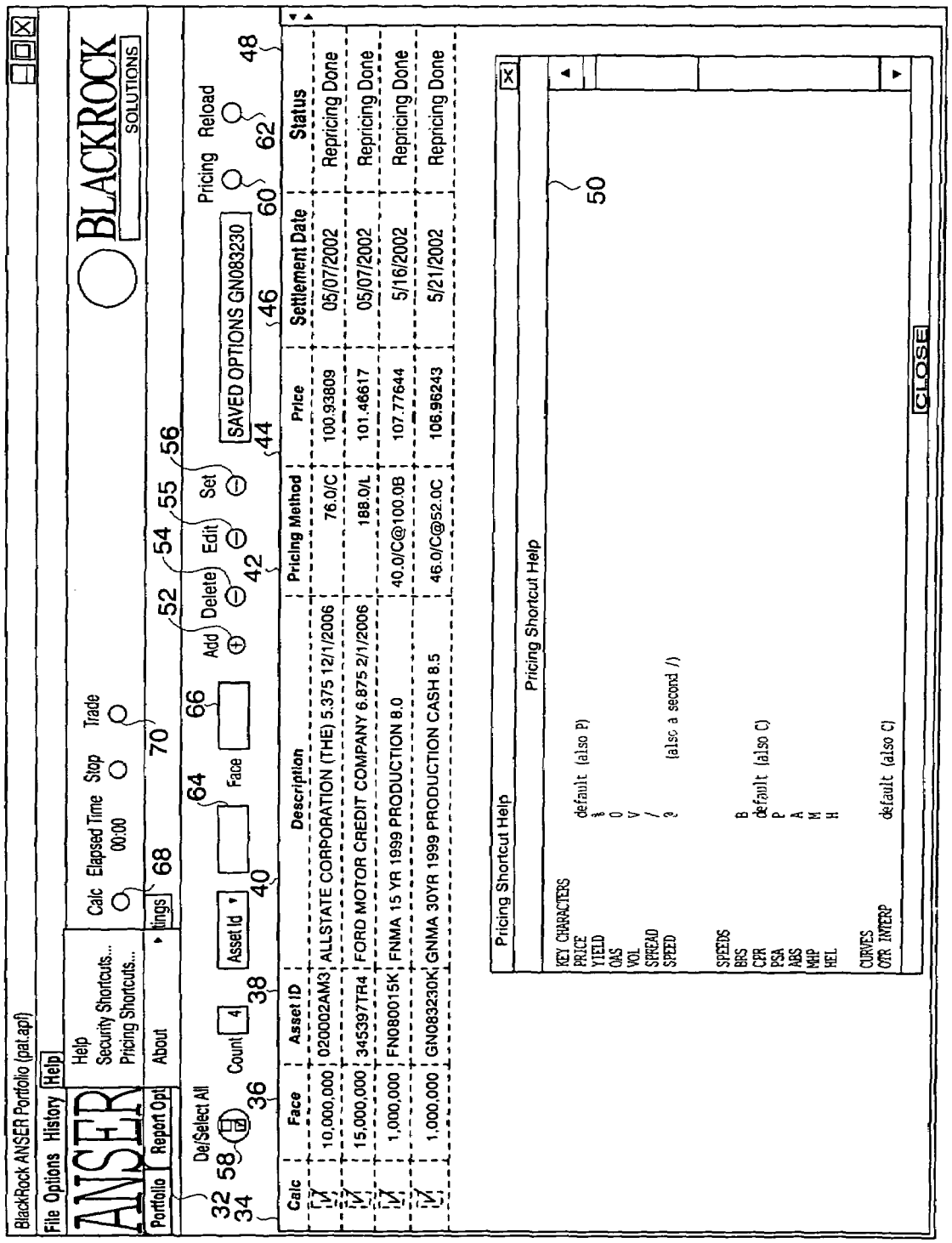
FIG. 2 is an illustration of a graphical user interface configured in accordance with a preferred embodiment of the subject invention which includes a list of characters for generating user-defined computer readable character strings representing pricing methods for the fixed income securities contained in a selected portfolio.

Referring now to FIG. 2, there is illustrated a graphical user interface (GUI) configured in accordance with a preferred embodiment of the subject invention and designated generally by reference numeral 30. Interface 30 includes, among other things, a tab 32 for accessing a portfolio of fixed income securities from portfolio database 24. In this example, the name of the portfolio that has been accessed is called pat. apf.

Each portfolio in the portfolio database 24, including portfolio pat. apf includes a plurality of columns including, among others, a "Calc" column 34 which enables a user to specify whether a pricing calculation should be performed on a specific security in the portfolio, and a Face column 36 for capturing the face value of a security. In addition, an "Asset ID" column 38 for capturing an identifier for a security, a column 40 for specifying the "Description" of a security, and a column 42 for specifying a "Pricing Method" using a unique computer readable data string of characters (e.g., letters, numbers and symbols).

There is a column 44 for a calculated "Price" based on a user-defined pricing method, and a column 46 for a "Settlement Date" of a transaction involving a security. There is also a "Status" column 48 for presenting the user with a message regarding the status of the pricing calculation (e.g., Repricing or Repricing Done) performed by the analytical server in cooperation with processor 14. The pricing calculation time can vary depending upon the user-defined pricing method and the asset class of the selected security. Additional columns may be included in a portfolio to present other forms of statistical and financial information.

The computer readable data strings used to define pricing methodologies in accordance with the subject invention are preferably constructed using the following characters:

| KEY CHARACTERS | |
| --- | --- |
| PRICE | default (also P) |
| YIELD | % |
| OAS | O |
| VOL | V |
| SPREAD | / |
| SPEED | @ (also a second /) |
| PREPAYMENT MODELS | |
| BRS | B |
| CPR | default (also C) |
| PSA | P |
| ABS | A |
| MHP | M |
| HEL | H |
| CURVES | |
| OTR INTERP | default (also C) |
| SWAP INTERP | S |
| LIBOR | L |
| TSY FIT | X |
| AGENCY REF | R |
| AGENCY BENCH | B |
| CSTRIP | CS |
| PSTRIP | PS |
| BENCHMARKS | |
| TSY OTR | default |
| SWAP RATE | S |
| AGENCY REF | R |
| AGENCY BENCH | B |

The pricing characters are presented in a help window 50 of graphical interface 30 entitled "Pricing Shortcuts" that is easily accessible by the user. Among each set of characters, there is a default setting which is utilized by the system in the absence of a user-defined entry. The key default setting for a security is price. In other words, in the absence of a user-defined pricing methodology, the pricing system 10 will specify the market price of the security. The default speed for mortgage prepayment models is the Constant/Conditional Prepayment Rate (CPR), while the default curve is the on-the-run interpolated Treasury curve and the default benchmark is the on-the-run Treasury. The default setting can be modified and is specifiable by the user.

By way of example, the first entry in the portfolio pat.apf is a corporate security described in column 40 as The Allstate Corporation with a 5.375% coupon maturing on Jan. 1, 2006. The pricing method in column 42 is represented by the character string 76.0/C. This character string converts to a 76 basis point static over the OTR curve.

The second entry in the portfolio pat. apf is also a corporate security which is described in column 40 as Ford Motor Credit Company with a 6.875% coupon maturing on Feb. 1, 2006. The pricing method in column 42 is represented by the character string 188.0/L. This converts to a 188 basis point static spread over the LIBOR curve.

The third entry in the portfolio pat.apf is a mortgage-backed security described in column 40 as FNMA 15 year 1999 production mortgages at an 8.0% interest rate. The pricing method in column 42 is represented by the character string 40.0/C@100B which converts to a 40 basis point spread over the OTR using a prepayment model designated as BRS at 100% intensity.

The fourth entry in the portfolio pat.apf is also a mortgage-backed security that is described in column 40 as GNMA 30 year 1999 production mortgages having a coupon of 8.5%. The pricing method set forth in column 42 for this security is represented by the character string 46.0/C@52.0C. The character string converts to a 46 basis point spread over the OTR curve using a prepayment model designated as CPR at a prepayment rate of 52%.

With continuing reference to FIG. 2, graphical user interface 30 includes several features for editing a portfolio including tabs 52, 54 and 55 for adding, deleting and editing portfolio entries respectively, as well as a tab 56 for locking in settings so that they cannot be modified, and a tab 58 for Selecting/Deselecting all of the entries in a portfolio for a user-defined pricing or risk calculation. Interface 30 also includes a Pricing tab 60 for enabling the system processor 14 to execute a pricing calculation based upon the user-defined pricing methods, and a Reload tab 62 for reloading a portfolio into the portfolio database 24. Graphical interface 30 also includes data entry fields 66 and 66 for entering the Asset ID and Face Value of a particular fixed income security.

In operation, a user can select a single security within a selected portfolio to perform a pricing calculation by checking the corresponding box in column 34, or the user can select a plurality of securities in the portfolio for a pricing calculation by checking the corresponding boxes in column 34. Alternatively, a user may select all of the securities in a portfolio for a pricing calculation by selecting tab 58. This selection will cause each box in column 34 to become checked.

Although the system and method of the subject invention have been described with respect to preferred embodiments, those skilled in the art will readily appreciate that changes and modifications may be made thereto without departing from the spirit and scope of the present invention as defined by the appended claims.

What is claimed is:

1. A computer-based system for pricing fixed income securities comprising:
   a) means for selecting a portfolio of fixed income securities stored in a portfolio database;
   b) means for determining a pricing method for a selected fixed income security in the selected portfolio by entering an expression in a field, where the expression includes a string of first, second and third sections representing a pricing method, wherein: the first section is a number to represent basis points; the second section is a character to represent an operation including at least P to represent price, % to represent yield, O to represent option adjusted spread (OAS), V to represent volatility, / to represent spread and @ to represent speed; and the third section is at least one character to represent a curve including at least C to represent interpolated on the run (OTR Interp), S to represent interpolated swap (SWAP Interp), L to represent London Inter-Bank Offered Rate (LIBOR), X to represent Treasury fit (TSY Fit), R to represent agency reference, B to represent agency benchmark, CS to represent coupon strip (CSTRIP), and PS to represent principal strip (PSTRIP); and
   c) means for calculating the price of the selected fixed income security based upon the designated pricing method.

2. A system as recited in claim 1, wherein the means for designating a pricing method for a selected fixed income security includes means for typing in a computer readable character string in a field of a graphical user interface, wherein the expression represents a preferred pricing methodology, wherein the means for designating a pricing method includes means for designating a pricing method based on market volatility.

3. A system as recited in claim 1, wherein the pricing benchmark is a reference point on a yield curve.

4. A system as recited in claim 1, wherein the means for designating a pricing method includes means for designating a pricing method based on a yield curve.

5. A system as recited in claim 4, wherein the means for designating a pricing method for a selected fixed security based on a yield curve includes a default pricing method based on the interpolated on-the-run curve.

6. A system as recited in claim 1, wherein the means for designating a pricing method includes means for designating a pricing method based on a spread.

7. A system as recited in claim 1, wherein the means for designating a pricing method includes means for designating a pricing method based on an option adjusted spread.

8. A system as recited in claim 7, wherein the means for designating a pricing method for a mortgage backed security includes a default pricing method wherein the projected prepayment speed is the CPR.

9. A system as recited in claim 1, wherein the selected fixed income security is a mortgage-backed security and the means for designating a pricing method includes means for designating a pricing method based on a projected prepayment model.

10. A system as recited in claim 9, wherein the means for designating a pricing method based on a projected prepayment model includes means for designating an intensity for prepayment speed.

11. A system as recited in claim 1, wherein the means for designating a pricing method for a selected fixed security includes a default pricing method wherein the price is based upon the full market price of the security.

12. A system as recited in claim 1, wherein the means for designating a pricing method for a selected fixed security based on a pricing benchmark includes a default pricing method based on the Treasury on-the-run curve.

13. A system as recited in claim 1, wherein the means for calculating the price of the selected fixed income security based upon the designated pricing method includes means for applying real-time market data to the calculation.

14. A system as recited in claim 1, wherein the string of the expression includes fourth and fifth sections representing a pricing method, wherein: the fourth section is another character to represent an operation including at least P to represent price, % to represent yield, O to represent OAS, V to represent Vol, / to represent spread and @ to represent speed; and the fifth section is at least one character representing a prepayment model including at least B to represent proprietary prepayment model (BRS), C to represent constant/conditional prepayment model (CPR), P to represent prepayment model (PSA), and H to represent home equity loan (HEL).

15. A computer-based system of pricing fixed income securities comprising:

a) a portfolio database containing a plurality of portfolios each having a plurality of fixed income securities;
b) a graphical user interface operatively associated with the portfolio database and including:
   i) means for selecting a portfolio of fixed income securities stored in the portfolio database; and
   ii) means for determining a pricing method for at least one selected fixed income security in the selected portfolio by entering an expression in a field of the graphical user interface, where the expression represents the pricing method and includes a string of first, second, third, fourth and fifth sections representing a pricing method, wherein: the first section is a number to represent basis points; the second section is a character to represent an operation including at least P to represent price, % to represent yield, O to represent option adjusted spread (OAS), V to represent volatility, / to represent spread and @ to represent speed; the third section is at least one character to represent a curve including at least C to represent interpolated on the run (OTR Interp), S to represent interpolated swap (SWAP Interp), L to represent London Inter-Bank Offered Rate (LIBOR), X to represent Treasury fit (TSY Fit), R to represent agency reference, B to represent agency benchmark, CS to represent coupon strip (CSTRIP), and PS to represent principal strip (PSTRIP); the fourth section is another character to represent an operation including at least P to represent price, % to represent yield, O to represent OAS, V to represent Volatility, / to represent spread and @ to represent speed; and the fifth section is at least one character representing a prepayment model including at least B to represent proprietary prepayment model (BRS), C to represent constant/conditional prepayment model (CPR), P to represent prepayment model (PSA), and H to represent home equity loan (HEL); and
c) a processor including means for calculating the price of the selected fixed income security based upon the computer readable character string.

16. A system as recited in claim 15, wherein the means for designating a pricing method includes means for designating a pricing method based on market volatility.

17. A system as recited in claim 15, wherein the means for designating a pricing method includes means for designating a pricing method based on yield.

18. A system as recited in claim 15, wherein the means for designating a pricing method includes means for designating a pricing method based on a pricing benchmark.

19. A system as recited in claim 18, wherein the means for designating a pricing method for a selected fixed security based on a pricing benchmark includes a default pricing method based on the Treasury on-the-run curve.

20. A system as recited in claim 15, wherein the pricing benchmark is a reference point on a yield curve.

21. A system as recited in claim 15, wherein the means for designating a pricing method includes means for designating a pricing method based on a yield curve.

22. A system as recited in claim 21, wherein the means for designating a pricing method for a selected fixed security based on a yield curve includes a default pricing method based on the interpolated on-the-run curve.

23. A system as recited in claim 15, wherein the means for designating a pricing method includes means for designating a pricing method based on a spread.

24. A system as recited in claim 15, wherein the means for designating a pricing method includes means for designating a pricing method based on an option adjusted spread.

25. A system as recited in claim 15, wherein the selected fixed income security is a mortgage-backed security and the means for designating a pricing method includes means for designating a pricing method based on a projected prepayment model.

26. A system as recited in claim 25, wherein the means for designating a pricing method based on a prepayment model includes means for designating an intensity for prepayment speed.

27. A system as recited in claim 25, wherein the means for designating a pricing method for a mortgage backed security includes a default pricing method wherein the projected prepayment speed is the CPR.

28. A system as recited in claim 15, wherein the means for designating a pricing method for a selected fixed security includes a default pricing method wherein the price is based upon the full market price of the security.

29. A system as recited in claim 15, wherein the means for calculating the price of the selected fixed income security based upon the designated pricing method includes means for applying real-time market data to the calculation.

30. A method of pricing fixed income securities comprising the steps of:
   a) selecting a portfolio of fixed income securities stored in a portfolio database;
   b) determining a pricing method for a selected fixed income security in the selected portfolio using a processor by typing in an expression in a field of a graphical user interface connected to the processor, where the expression includes first, second, third, fourth and fifth sections representing a pricing method, wherein: the first section is a number to represent basis points; the second section is a character to represent an operation including at least P to represent price, % to represent yield, O to represent option adjusted spread (OAS), V to represent volatility, / to represent spread and @ to represent speed; the third section is at least one character to represent a curve including at least C to represent interpolated on the run (OTR Interp), S to represent interpolated swap (SWAP Interp), L to represent London Inter-Bank Offered Rate (LIBOR), X to represent Treasury fit (TSY Fit), R to represent Agency Reference, B to represent Agency benchmark, CS to represent coupon strip (CSTRIP), and PS to represent principal strip (PSTRIP); the fourth section is another character to represent an operation including at least P to represent price, % to represent yield, O to represent OAS, V to represent volatility, / to represent spread and @ to represent speed; and the fifth section is at least one character representing a prepayment model including at least B to represent proprietary prepayment model (BRS), C to represent constant/conditional prepayment model (CPR), P to represent prepayment model (PSA), and H to represent home equity loan (HEL); and
   c) calculating by the processor the price of the selected fixed income security based upon the designated pricing method.

31. A method according to claim 30, wherein the step of designating a pricing method for a selected fixed income security in the selected portfolio includes the step of entering a computer readable character string in a field of a graphical user interface, wherein the computer readable character string represents a preferred pricing methodology.

32. A method according to claim 30, wherein the step of designating a pricing method for a selected fixed income security in the selected portfolio includes the step of designating a pricing method for a plurality of fixed income securities in the selected portfolio.

33. A method according to claim 30, wherein the step of designating a pricing method for a selected fixed income security in the selected portfolio includes the step of designating a pricing method for each of fixed income securities in the selected portfolio.

* * * * *